United States Patent [19]

Morimoto

[11] Patent Number: 5,406,542
[45] Date of Patent: Apr. 11, 1995

[54] SYSTEM FOR REDUCING CROSSTALK IN AN OPTICAL SCANNING DEVICE

[75] Inventor: Yasuaki Morimoto, Sakura Shataku, Japan

[73] Assignee: Deutsche Thomson Brandt GmbH, Villingen Schwenningen, Germany

[21] Appl. No.: 45,080

[22] Filed: Apr. 12, 1993

[30] Foreign Application Priority Data

Aug. 25, 1990 [DE] Germany .................. 40 26 875.6

[51] Int. Cl.$^6$ .............................................. G11B 7/00
[52] U.S. Cl. ...................................... 369/120; 369/112; 369/44.41
[58] Field of Search ................ 369/120, 121, 122, 109, 369/110, 116, 13, 44.37, 44.38, 44.41, 112, 124, 126, 107; 250/206.1, 206.3, 225

[56] References Cited

U.S. PATENT DOCUMENTS

| | | | |
|---|---|---|---|
| 4,399,529 | 8/1983 | Leterme et al. | 369/122 |
| 4,858,218 | 8/1989 | Takagi et al. | 369/109 |
| 4,935,913 | 6/1990 | Shinoda | 369/122 |
| 4,959,821 | 9/1990 | Morimoto et al. | 369/13 |
| 5,073,888 | 12/1991 | Takahashi et al. | 369/110 |

FOREIGN PATENT DOCUMENTS 0309721 8/1988 European Pat. Off. .
2578083 2/1986 France .

OTHER PUBLICATIONS

Patent Abstracts Of Japan vol. 13 No. 353 (P-913) [3701] Aug. 8, 1989.
Patent Abstracts Of Japan, vol. 10, No. 202 (2258) [2258] Jul. 15, 1986.

Primary Examiner—Paul M. Dzierzynski
Assistant Examiner—Kiet T. Nguyen
Attorney, Agent, or Firm—Joseph S. Tripoli; Lester L. Hallacher

[57] ABSTRACT

A system for reducing crosstalk in an optical scanning device for recording and reading optical data and magneto-optical data arranged in tracks of a recording medium includes a source for providing two light beams which are scanned along the tracks. The light beams are polarized in two polarization directions, are focused onto one of the tracks and are separated by a predetermined distance along the direction of the tracks, when incident on the tracks. Reflected light from the recording medium is focused onto first and second pairs of sensors. The difference of the signals from the first pair of sensors is compared with a delayed version of the difference of the signals from the second pair of sensors to provide a further signal representing magneto-optically recorded data. Signals from a first sensor of each pair of sensors may be summed to detect optically recorded data. One of the sensors of one pair of sensors may be realized as a four quadrant detector to provide conventional tracking and focusing error signals.

6 Claims, 4 Drawing Sheets

SYSTEM FOR REDUCING CROSSTALK IN AN OPTICAL SCANNING DEVICE

This is a continuation of PCT application PCT/EP 91/01557, filed Aug. 16, 1991 by Yasuaki Morimoto and titled "Optical Scanning Device".

FIELD OF THE INVENTION

This invention is directed to an optical scanning device for reading from and writing onto an optical or a magneto-optical recording medium. A light source radiates light onto the recording medium and the light reflected from the recording medium is directed to either a first photodetector or to a second photodetector depending on the direction of polarization or the reflected light.

DESCRIPTION OF THE PRIOR ART

A known optical recording medium is, for example, the compact disk (CD), which has a transparent layer overlaying a light-reflective aluminum layer. The light-reflective aluminum layer has indentations, so-called pits, which represent the data stored on the compact disk. The data can be read from the compact disk by means of an optical scanning device because the reflective behavior of the light-reflective aluminum layer depends on the pattern that the indentations form on the disk. An indentation, also frequently called a groove, reflects less light than a hill, often also frequently designated as a land. Therefore, depending on the intensity of the light reflected from the CD, the optical scanning device recognizes whether the bit which has been scanned is a logic one or a logic zero.

Another type of optical recording medium, known under the designation magneto-optical disk, is described in the paper "Magnetooptische Versuche dauern an" ("Magneto-optical Tests are Continuing") in Funkschau 13 from Jun. 20, 1986, pages 37-41. In contrast to a usual compact disk, a magneto-optical disk has no pits. The transparent layer overlays a magnetic layer in which the data can be recorded and from which data can be read out. When writing data onto a magneto-optical disk the magnetic layer is heated beyond the Curie temperature by means of a laser beam focused onto the disk. However, it is usually sufficient to only warm up the magnetic layer to the compensation temperature which lies a little below the Curie temperature. An electromagnet is located behind the focal point on the disk and magnetizes the area heated by the laser beam in one of two directions of magnetization. As the heated point cools to below the Curie temperature after the laser beam is removed, the direction of magnetization determined by the electromagnet remains fixed. In this way, the individual bits are stored as domains of differing directions of magnetization. The first direction of magnetization of a domain represents to a logic one while the opposite direction of magnetization represents a logic zero.

In order to read the data use is made of the Kerr Effect. The plane of polarization of a linearly-polarized light beam is turned by a measurable angle upon reflection from a magnetized mirror. The plane of polarization of the reflected light beam is turned to the right or the left, depending upon the direction of magnetization. Hence, because the individual domains on tile disk operate like magnetized mirrors, the plane of polarization of a scanning light beam is turned by a measurable angle to the right or the left according to the direction of magnetization of the domain from which the light is reflected. By the noting the direction of polarization of the reflected light beam the optical scanning device detects which bit is present, a logic one or a logic zero. In contrast to a compact disk with pits, a magneto-optical disk can be erased and written almost indefinitely.

A recording medium which represents a combination of an optical and a magneto-optical disk is described in DE-OS 37 32 875. With this recording medium data are stored by pits and also by magnetic domains in a magnetic layer of the disk. The transparent magnetic domains overlay the reflective pits and therefore data are stored in the pits and also in the magnetic layer at each point. The storage capacity of such a disk is, therefore, twice that of a standard optical disk or a magneto-optical disk.

An optical scanning device is illustrated in DE-OS 37 32 874, which is suitable for the three types of disks mentioned above, because this optical scanning device is capable of reading data from an optical disk, for example a compact disk, and also from a magneto-optical disk and a disk which is known from DE-OS 37 32 875. In this optical scanning device the light from a laser is focused onto the disk and reflected to a polarization beam splitter which reflects it to either a first or a second photodetector depending on the direction of polarization. The data signal, which is stored in the magnetic domains of the disk, is obtained from the difference between the photoelectric voltages of the first and second photodetectors. The data signal which reproduces the data stored on the disk by means of the pits is generated from the sum of the photoelectric voltages of the first and second photodetectors. The optical scanning device described in DE-OS 37 32 874 can, using a disk like the one described in DE-OS 37 32 875, read simultaneously both the data stored by means of the pits and the data stored in the magnetic domains. However, because the pits also cause an albeit very small rotation of the direction of polarization of the light radiated from the laser, the crosstalk between the data signal obtained by scanning the pits and the data signal read from the magnetic domains by means of the Kerr Effect cannot be completely avoided. In order to sufficiently attenuate this crosstalk minimum distances between the individual data tracks as well as a minimum length and minimum width for the pits must be maintained. However, these minimum dimensions limit the storage capacity of the recording medium.

SUMMARY OF THE INVENTION

It is, therefore, an object of the invention to suppress as completely as possible the undesired crosstalk. The invention achieves this objective by the use of two light beams. A forward light beam and a rearward light beam, the directions of polarization of which are perpendicular to each other, are aligned onto the recording medium in such a way that the forward light beam strikes the recording medium at a predetermined distance in front of the rearward light beam. The forward light beam reflected from the recording medium is, depending on its direction of polarization, directed to either a first or a second photodetector. The backward light beam reflected from the recording medium is, depending on its direction of polarization, directed to either a four quadrant photodetector, consisting of four photodiodes, or a third photodetector. A focusing error signal for a focus regulation circuit and a track error signal for a tracking regulation circuit are generated from the output signals of the four quadrant photodetector. The data signal, which reproduces the data stored by means of the pits, is obtained by adding the output signals from the first and second photodetectors. The data signal which reproduces the data stored in the magnetic layer of the recording medium is obtained by adding and subtracting the output signals from the first, second and third photodetectors as well as by temporally delaying the output signals from the first and second photodetectors, just so as to compensate for the distance between the forward side and rearward light beams.

DETAILED DESCRIPTION OF THE PREFERRED EMBODIMENTS

Figure 1:
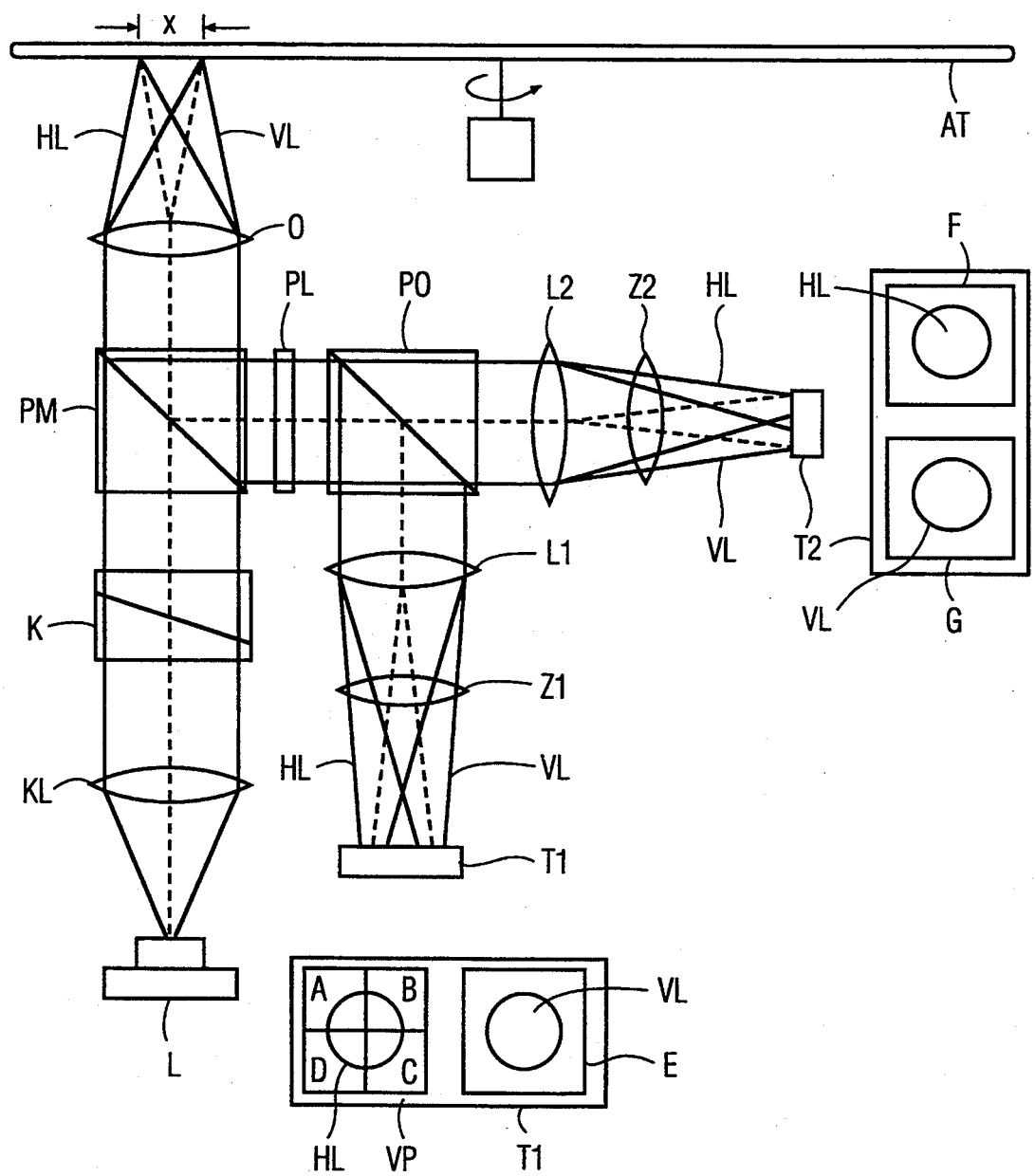
FIG. 1 is a preferred embodiment of the invention.

In FIG. 1, the light generated by a laser L shines through a collimator lens KL onto a double-refracting crystal K which splits the light from the laser L into a forward light beam VL and a rearward light beam HL, the directions of polarization of beams VL and HL are perpendicular to each other. The forward light beam VL and the rearward light beam HL radiate from the double-refracting crystal K through a prismatic beam splitter PM and an objective lens O which focuses the two light beams VL and HL onto the recording medium AT by means of a focus regulation circuit. The two light beams VL and HL are reflected from the recording medium AT to the objective lens O and to the prismatic beam splitter PM, which directs them to a half-wave ($\lambda/2$) plate PL and a polarization beam splitter PO located after the half-wave plate PL. The polarization beam splitter PO directs the forward light beam VL to either a photodetector E or a photodetector G depending on the direction of polarization of the light beam. The polarization beam splitter PO directs the rearward light beam HL to, depending on the direction of polarization, either a four quadrant photodetector VP, which is constructed from four photodiodes A, B, C and D, or a photodetector F.

Figure 2:
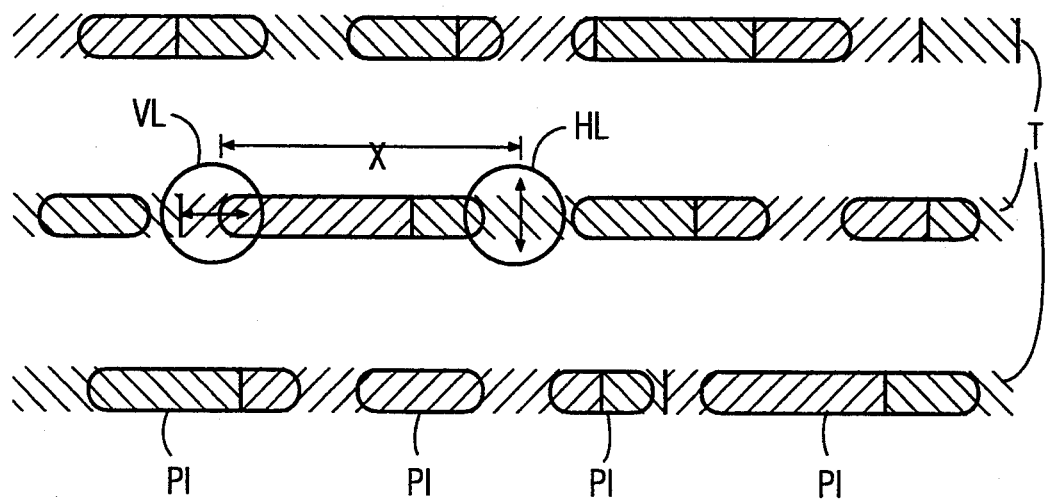
FIG. 2 shows the position of the light beams on the record medium.

A section of the surface of the recording medium AT is illustrated in FIG. 2. The pits PI are arranged alongside the data tracks T. The direction of magnetization of the magnetic layer is indicated by the different hatching. The forward light beam VL and the rearward light beam HL are focused onto the recording medium AT by means of a focus regulation circuit and guided along the data tracks T by means of the tracking regulation circuit. The forward light beam VL shines onto the recording medium AT at a predetermined distance X ahead of the rearward light beam HL. As indicated by the twin-headed arrows, the direction of polarization of the forward light beam VL lies parallel to the track direction while the direction of polarization of the rearward light beam HL, lies perpendicular to the track direction.

Figure 3:
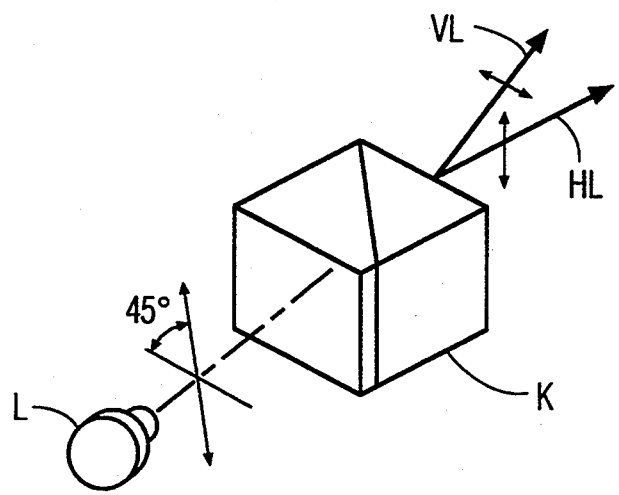
FIG. 3 shows a double-refracting crystal for generating two light beams.

The laser L and the double-refracting crystal K are illustrated in FIG. 3. The double-refracting crystal K generates the forward light beam VL and the rearward light beam HL, with the directions of polarization shown in FIG. 2 and the distance X at the recording medium AT, from the light beam generated by the laser L which has a direction of polarization forming an angle of 45° to the horizontal.

Figure 4:
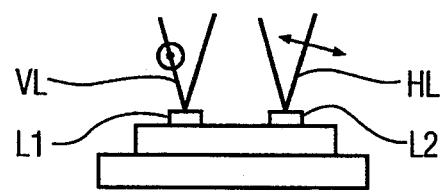
FIG. 4 shows two lasers for generating two light beams.

Instead of a laser and a double-refracting crystal, two lasers L1 and L2 adjacent each other can be provided to generate the forward light beam VL and the rearward light beam HL, as shown in FIG. 4. The directions of polarization of the two laser beams VL and HL are perpendicular to each other.

Figure 5:
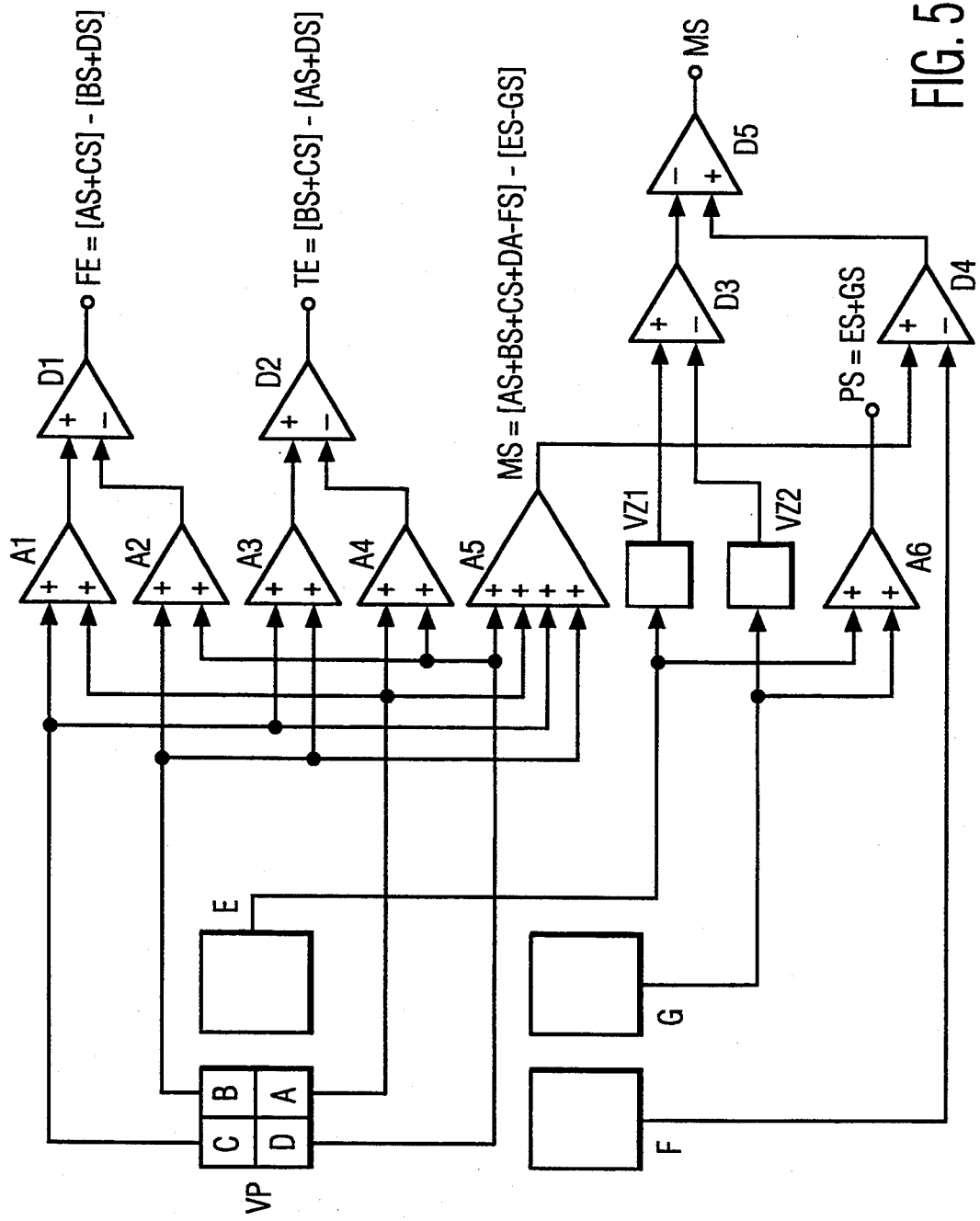
FIG. 5 shows an electrical circuit arrangement for generating the regulating and data signals.

The circuit arrangement illustrated in FIG. 5 will now be described, and it will be explained subsequently how the regulating signals for the focus and tracking regulation circuits, and also the data signals are generated from the output signals of the photodetectors. In FIG. 5 the outputs of the two photodiodes A and C, which lie diagonally opposite each other in the four quadrant photodetector VP, are coupled with the input terminals of an adding element A1. The outputs of the other two photodiodes B and D, which also are diagonally disposed in the four quadrant photodetector VP, are coupled with the input terminals of an adding element A2. The output of adding element A1 is coupled with the addition input terminal of a differential amplifier D1 while the output of adding element A2 is coupled with the subtraction input terminal of D1. The differential amplifier D1 forms the focusing error signal $FE=(AS+CS)-(BS+DS)$, the regulating signal for the focus regulation circuit, from the output signals AS, BS, CS and DS of the photodiodes A, B, C and D in the four quadrant photodetector VP. The focusing error signal is generated according to the so-called astigmatism method.

The output signals BS and CS from the first two adjacent photodiodes B and C of the four quadrant photodetector VP are added in an adding element A3 the output of which is coupled with the addition input terminal of a differential amplifier D2. The output signals AS and DS from the other two adjacent photodiodes A and D of the four quadrant photodetector VP are added in an adding element A4 the output of which is coupled with the subtraction input terminal of a differential amplifier D2. The tracking error signal $TE=(BS+CS)-(AS+DS)$, the regulating signal for the tracking regulation circuit generated according to the push-pull method, can be picked up at the output terminal of the differential amplifier D2.

The output signals ES and GS from photodetector E and photodetector G are added in an adding element A6 the output signal PS of which represents the data signal obtained from the pits.

The output signals AS, BS, CS and DS from the photodiodes A, B, C and D of the four quadrant photodetector VP are added in an adding element A5 the output of which is coupled with the addition input terminal of a differential amplifier D4. The output signal FS of the photodetector F is fed to the subtraction input terminal of the differential amplifier D4. The output signal ES of the photodetector E is fed via a delay element VZ1 to the addition input terminal of a differential amplifier D3. The output signal GS from the photodetector G is fed via a delay element VZ2 to the subtraction input terminal of the differential amplifier D3. The output of the differential amplifier D3 is coupled to the subtraction input terminal of a differential amplifier D5 the addition input terminal of which is coupled to the output of the differential amplifier D4. Therefore, the data signal $MS=(AS+BS+CS+DS-FS)-(ES-GS)$, generated from the data stored in the magnetic layer of the recording medium AT, can be picked up at the output of the differential amplifier D5.

The two delay elements VZ1 and VZ2 are necessary because the data signal MS, which reproduces the data recorded in the magnetic layer, is, unlike the data signal PS, which reproduces the data stored by means of the pits, not generated from the forward light beam VL alone but rather from both the forward and the rearward light beams which are separated from each other on the recording medium by the distance X. The two delay elements VZ1 and VZ2 compensate for the temporal offset between the output signals ES and GS of the photodetectors E and G on the one hand, and the output signals AS, BS, CS, DS and FS from the photodetectors VP and F on the other hand.

Because the forward light beam VL and the rearward light beam HL have the same cross-section, it is advisable to select all photodetectors VP, E, F, and G to be of equal size. In FIGS. 1 and 5 the photodetectors are, therefore, illustrated as equally sized squares.

By scanning the recording medium with two light beams which strike the recording medium at a predetermined separation, instead of using one light beam, as proposed in DE-OS 37 32 874, the crosstalk is suppressed to a large extent.

Figure 6:
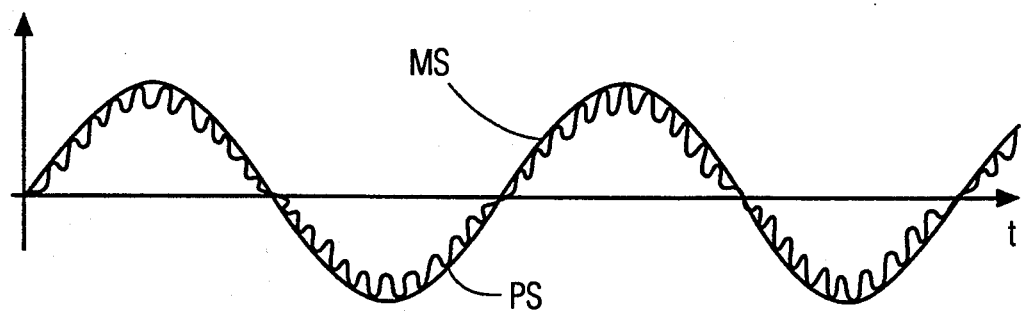
FIG. 6 shows the data signal which reproduces the data stored in the magnetic layer.

The data signal MS having a frequency of, for example, 10 kHz, which is obtained from the data stored in the magnetic layer of the recording medium is shown in FIG. 6. However, the data signal MS is superimposed with an oscillation of, for example, 100 kHz, caused by the data signal which is obtained from the data stored by means of the pits. The amplitudes of the superimposed oscillation of 100 kHz can, however, be considerably reduced if, as is shown in FIG. 4, two lasers are provided for generating the forward and rearward light beams.

The invention is suitable for an optical recording-playback device which can read both optical and magneto-optical recording media, and a combination of both. The invention can be advantageously used in data processing because data can be simultaneously read and recorded. However, for CD players and video disk players the invention also offers, for example, the advantage that sound and picture can be recorded at the same time as playback.

I claim:

1. In an optical scanning device for recording and reading optical data and magneto-optical data arranged in tracks in a recording medium, a system for reducing crosstalk comprising:

means for providing first and second scanning light spots on a single track of said recording medium, said first and second scanning light spots being separated by a predetermined distance along the direction of said single track and having different polarization directions;

a first pair of photosensors having a first and a second photosensor and a second pair of photosensors having a first and a second photosens, each of said photosensors providing an output signal;

means for directing reflected light from said first scanning light spot to the first photosensor of said first or second pair of photosensors depending upon the polarization of the reflected light from said first scanning light spot and for directing reflected light from said second scanning light spot to the second photosensor of said first or second pair of photosensors depending upon the polarization the reflected light from said second scanning light spot;

delay means for delaying the output signals of the respective second photosensors of the first and second pairs photosensors; and a circuitry for generating a signal representing the difference between, a) an output signal representing the difference between the output signals of the respective first photosensors of the first and second pairs of photosensors, and b) an output signal representing the difference between the output signals of the respective second photosensors of the first and second pairs of photosensors provided by said delay means, to provide a signal representing detected magneto-optically recorded data with reduced crosstalk.

2. The optical scanning device set forth in claim 1 further including:

signal combining means for summing the output signals from the second photosensors of the first and second pairs of photosensors to provide a signal representing detected optically recorded data.

3. The optical scanning device set forth in claim 1 wherein the first photosensor of said first pair of photosensors is a four quadrant detector which provides four output signals, and said four output signals of said first photosensor of the first pair of photosensors consist of the sum of said four output signals.

4. The optical scanning device set forth in claim 3 further including:

means coupled to said four output signals for generating a focusing error signal; and means coupled to said four output signals for generating a tracking error signal.

5. The optical scanning device set forth in claim 1 further comprising:

said delay means including first and second delay means for respectively delaying the output signals provided by the respective second photosensors of the first and second pairs of photosensors;

said circuitry including first, second and third differential signal combining means each having inverting and non-inverting input terminals and an output terminal, the third differential signal combining means having its inverting and non-inverting input terminals coupled to the output terminals of the first and second differential signal combining means respectively and its output terminal providing said signal representing detected magneto-optically recorded data;

means coupling the output signals of the first photosensors of the first and second pairs of photosensors to the non-inverting and inverting input terminals of the second differential signal combining means respectively;

means coupling the first delay means between the second photosensor of the first pair of photosensors and the non-inverting input terminal of the first differential signal combining means; and means coupling the second delay means between the second photosensors of the second pair of photosensors and the inverting input terminal of the first differential signal combining means.

6. The optical scanning device set forth in claim 1 wherein said means for providing first and second scanning light spots comprises:
  a laser for providing a light beam;
  means for splitting said light beam into two beams having relative orthogonal polarization angles; and
  a focusing lens for focusing said two beams on said recording medium.

* * * * *

UNITED STATES PATENT AND TRADEMARK OFFICE
CERTIFICATE OF CORRECTION

PATENT NO. : 5,406,542
DATED : April 11, 1995
INVENTOR(S) : Yasuaki Morimoto It is certified that error appears in the above-identified patent and that said Letters Patent is hereby corrected as shown below:

In the claims:

Column 5, Claim 1, line 67, change or delete "photosens" and in its place add --photosensor--

Column 6, Claim 1, line 9, before "the" insert --of--

Signed and Sealed this

Third Day of September, 1996

Attest:

BRUCE LEHMAN

*Attesting Officer*     *Commissioner of Patents and Trademarks*